(12) United States Patent
Pritchard (10) Patent No.: US 10,995,859 B2
(45) Date of Patent: May 4, 2021

(54) THERMALLY ACTUATED GROMMET (71) Applicant: Honda Motor Co., Ltd., Tokyo (JP)

(72) Inventor: Joshua D. Pritchard, Worthington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 177 days.

(21) Appl. No.: 15/963,182

(22) Filed: Apr. 26, 2018

(65) Prior Publication Data

US 2019/0331226 A1 Oct. 31, 2019

(51) Int. Cl.
*F16J 15/3284* (2016.01)
*B62D 65/02* (2006.01)
*B62D 1/16* (2006.01)

(52) U.S. Cl.
CPC .......... *F16J 15/3284* (2013.01); *B62D 1/16* (2013.01); *B62D 65/02* (2013.01)

(58) Field of Classification Search
CPC .......... F16J 15/3284; F16J 15/36; B62D 1/16; B62D 65/02
See application file for complete search history.

(56) References Cited

U.S. PATENT DOCUMENTS

| | | | | |
|---|---|---|---|---|
| 1,460,513 A | * | 7/1923 | Ross | B62D 1/16 74/490 |
| 1,674,623 A | * | 6/1928 | Claus | B62D 1/16 74/490 |
| 1,892,332 A | * | 12/1932 | Des Roches | F16C 33/74 384/131 |
| 2,419,385 A | * | 4/1947 | Beier | F16J 15/36 277/384 |
| 2,672,360 A | * | 3/1954 | Chambers, Jr. | F16J 15/36 277/374 |
| 2,866,656 A | * | 12/1958 | Stoymir | F16J 15/36 277/383 |
| 3,699,942 A | * | 10/1972 | Moray | F01L 3/08 123/188.6 |
| 4,834,037 A | * | 5/1989 | Lafever | F01L 3/08 123/188.6 |
| 6,287,399 B1 | | 9/2001 | Urushiyama | |
| 6,346,132 B1 | | 2/2002 | Huber et al. | |
| 6,692,026 B2 | | 2/2004 | Gianaris et al. | |
| 6,807,391 B2 | | 10/2004 | Payne et al. | |

(Continued)

FOREIGN PATENT DOCUMENTS

| | | | | |
|---|---|---|---|---|
| CN | 206054733 | | 3/2017 | |
| JP | 58110336 A | * | 6/1983 | .......... B60Q 1/1461 |

(Continued)

*Primary Examiner* — Eugene G Byrd
(74) *Attorney, Agent, or Firm* — Rankin, Hill & Clark LLP (57) ABSTRACT

A tunable, thermally actuate, self-sealing grommet for sealing a hole in a vehicle panel through which a steering gearbox protrudes from an engine room to a passenger compartment. The grommet includes a shape memory alloy component embedded in a resin matrix. The shape memory alloy is selectively moveable from a deformed configuration toward a pre-deformed configuration upon being heated to a critical temperature from heat from an initial operation of an engine of the vehicle, which causes a sealing portion of the grommet to move from a non-engagement position to an engagement position such that the sealing portion contacts the panel to form a water-tight seal around the hole.

20 Claims, 4 Drawing Sheets

(56) References Cited

U.S. PATENT DOCUMENTS

| | | | |
|---|---|---|---|
| 7,005,018 B2 | 2/2006 | Julien | |
| 7,288,326 B2 | 10/2007 | Elzey et al. | |
| 7,484,760 B2 | 2/2009 | Suzuki et al. | |
| 7,638,921 B2 | 12/2009 | Browne et al. | |
| 7,669,799 B2 | 3/2010 | Elzey et al. | |
| 7,832,765 B2 | 11/2010 | Park | |
| 7,878,544 B2 | 2/2011 | Arce et al. | |
| 7,918,484 B2 | 4/2011 | Braun et al. | |
| 7,939,178 B2 | 5/2011 | Sar et al. | |
| 8,256,829 B2 | 9/2012 | Browne et al. | |
| 8,469,399 B2 | 6/2013 | Allen | |
| 8,651,527 B1 | 2/2014 | Allen | |
| 9,255,488 B2 | 2/2016 | Szwedowicz et al. | |
| 9,488,241 B2 | 11/2016 | Browne et al. | |
| 9,567,113 B2 | 2/2017 | Litwinski | |
| 2007/0125461 A1 | 6/2007 | Hollaender et al. | |
| 2013/0042718 A1 | 2/2013 | Browne et al. | |
| 2013/0240096 A1 | 9/2013 | Browne et al. | |
| 2014/0314362 A1* | 10/2014 | Bussit | F16C 19/163 384/515 |
| 2014/0321780 A1* | 10/2014 | Bussit | F16C 27/066 384/125 |
| 2014/0345414 A1* | 11/2014 | Erhardt | F16C 19/163 74/492 |
| 2015/0054231 A1* | 2/2015 | Lichtenberg | B62D 1/16 277/636 |
| 2015/0218889 A1 | 8/2015 | Carroll et al. | |
| 2015/0232973 A1 | 8/2015 | Browne et al. | |
| 2015/0316105 A1* | 11/2015 | Boke | F16C 35/02 384/438 |
| 2016/0247647 A1* | 8/2016 | Usuya | H01H 25/065 |
| 2017/0146163 A1 | 5/2017 | Bandola et al. | |
| 2017/0234434 A1* | 8/2017 | Shuto | F16J 15/36 277/504 |
| 2020/0055537 A1* | 2/2020 | Lee | F16C 11/0671 |

FOREIGN PATENT DOCUMENTS

| | | | | |
|---|---|---|---|---|
| JP | 59006169 A | * | 1/1984 | B62D 1/16 |
| JP | 09014261 A | * | 1/1997 | F16C 3/035 |
| JP | 10103350 A | * | 4/1998 | F16C 33/20 |
| JP | 2000199569 A | * | 7/2000 | F16J 3/042 |
| JP | 2002130266 A | * | 5/2002 | F16C 25/083 |

* cited by examiner

THERMALLY ACTUATED GROMMET

BACKGROUND

Vehicle steering systems often include a steering gearbox or other assembly that passes through a hole in a vehicle body panel that separates an engine room and an interior passenger compartment of a vehicle. Water intrusion through this hole from the engine room to the vehicle compartment causes various problems including corrosion.

Sealing of vehicle steering systems to prevent the intrusion of water from the vehicle engine room to the interior of a vehicle can be accomplished in one method by the use of a rubber grommet, which surrounds the steering gearbox and is linearly moved towards the panel during vehicle assembly to compress the grommet against the panel to create a water-tight seal between the grommet and the panel. However, when using this type of compression style grommet, the necessary compression of the grommet to make a satisfactory seal is best achieved when the direction of compression of the grommet is along an axis of the grommet and perpendicular to the surface of the panel. The shape, arrangement, and orientation of vehicle components does not always allow for the axis of the grommet to be perpendicular to the surface of the panel, and therefore does not allow for perpendicular compression of the grommet with respect to the surface. In this instance, non-perpendicular compression of the grommet with respect to the surface can produce an incomplete seal and allow for water intrusion.

In a second method, a rubber grommet with a pivot feature is mounted in a fixed position relative to the steering gearbox during assembly. Proper sealing of the hole requires an operator to flip the pivot feature to mate the grommet with the panel to create a water-tight seal around the hole. In this second method, it is possible for the grommet to be flipped before the grommet is properly placed on the steering gearbox, which does not allow for proper assembly or sealing and which can lead to water intrusion through the hole.

In a third method, a multi-piece component is pre-assembled to the steering gearbox. When the steering gearbox is assembled as part of the vehicle, the multi-piece component is fixed in a position relative to the panel using various fastening mechanisms that creates a seal against water intrusion.

The second and third sealing methods rely on operators to actuate the sealing features of the grommet during assembly in order to create the seal. Through operator mistake, it is therefore possible for the sealing features to be improperly actuated or not actuated at all. If not properly actuated, the sealing features are ineffective for preventing water intrusion through the hole in the panel.

BRIEF DESCRIPTION

According to one aspect, a self-sealing vehicle steering gearbox grommet comprises a sealing portion including a shape memory alloy embedded in a resin matrix. The shape memory alloy includes a base and a plurality of fingers extending away from the base and towards an engagement end of the sealing portion. The shape memory alloy is selectively moveable from a deformed configuration toward a pre-deformed configuration upon being heated to a critical temperature.

According to another aspect, a vehicle assembly method includes providing a self-sealing grommet comprising a sealing portion including a shape memory alloy embedded in a resin matrix. The sealing portion is activatable to move from a non-engagement position to an engagement position. The method includes arranging the grommet on a steering gearbox of the vehicle and adjacent to a hole in a surface of the vehicle such that the grommet is in the non-engagement position and does not contact the surface. The method includes operating the vehicle to heat the sealing portion to a critical temperature to thereby activate and move the sealing portion from the non-engagement position to the engagement position such that the sealing portion contacts the surface and seals the hole.

DETAILED DESCRIPTION

The present subject matter provides a polymer composite grommet that includes a shape memory alloy component embedded in a resin matrix. The shape memory alloy component is included in a sealing portion of the grommet. The shape memory alloy is embedded in the resin matrix while the shape memory alloy is in a trained pre-deformed configuration and in an austenite phase. Upon embedding the shape memory alloy in molten resin and cooling the resin to room temperature to solidify the resin, the shape memory alloy will return to its twinned martensite phase.

The shape memory alloy is then deformed to a deformed configuration and into a detwinned martensite phase causing the sealing portion to be in a non-engagement position. The grommet will then be assembled on a steering gearbox in an engine room of the vehicle. Since the sealing portion is in a non-engagement position, the sealing portion does not contact a vehicle panel and hole in the vehicle panel through which the steering gearbox protrudes. The shape memory alloy will remain in the deformed configuration and the sealing portion will remain in the non-engagement position throughout vehicle assembly because of the rigidity of the shape memory alloy.

Upon initial operation of the vehicle engine, heat from the engine will actuate the shape memory alloy to move from the deformed configuration toward the pre-deformed configuration. This causes the sealing portion of the grommet to move from the non-engagement position to an engagement position where the sealing portion of the grommet contacts the surface and forms a water-tight seal against the surface and around the hole, thus preventing water intrusion from the engine room and through the hole in the panel.

The shape memory alloy is tuned so it has predetermined austenite start and finish temperatures that are below an engine room operating temperature. By tuning the shape memory alloy in this way to establish predetermined austenite start and finish temperatures, the sealing portion of the grommet can be thermally activated to move toward the pre-deformed configuration as a result of the phase transformation of the shape memory alloy component during initial engine operation. In addition, the geometry of the shape memory alloy may be configured to ensure that sufficient sealing force is applied against the surface to prevent water intrusion through the hole.

Figure 1:
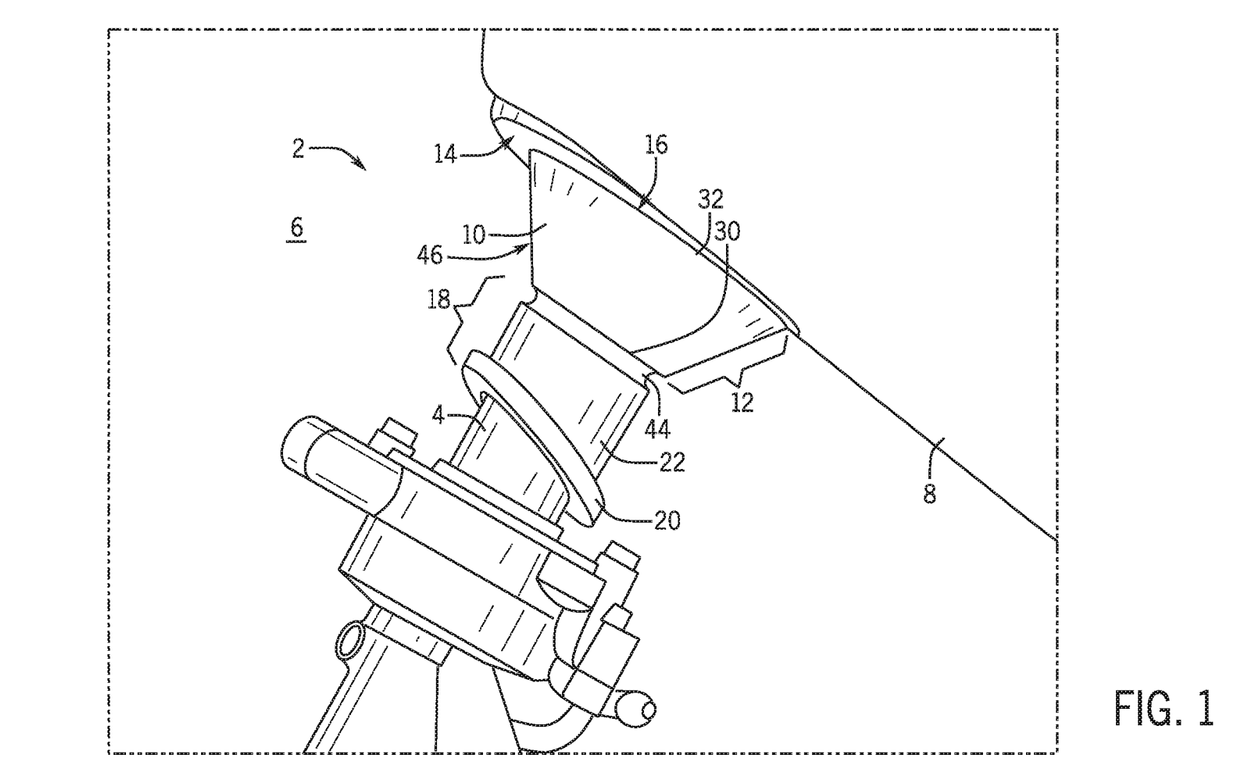
FIG. 1 is a perspective view of a vehicle assembly in accordance with the present subject matter.
Figures 2A, 2B, 2C, 2D:
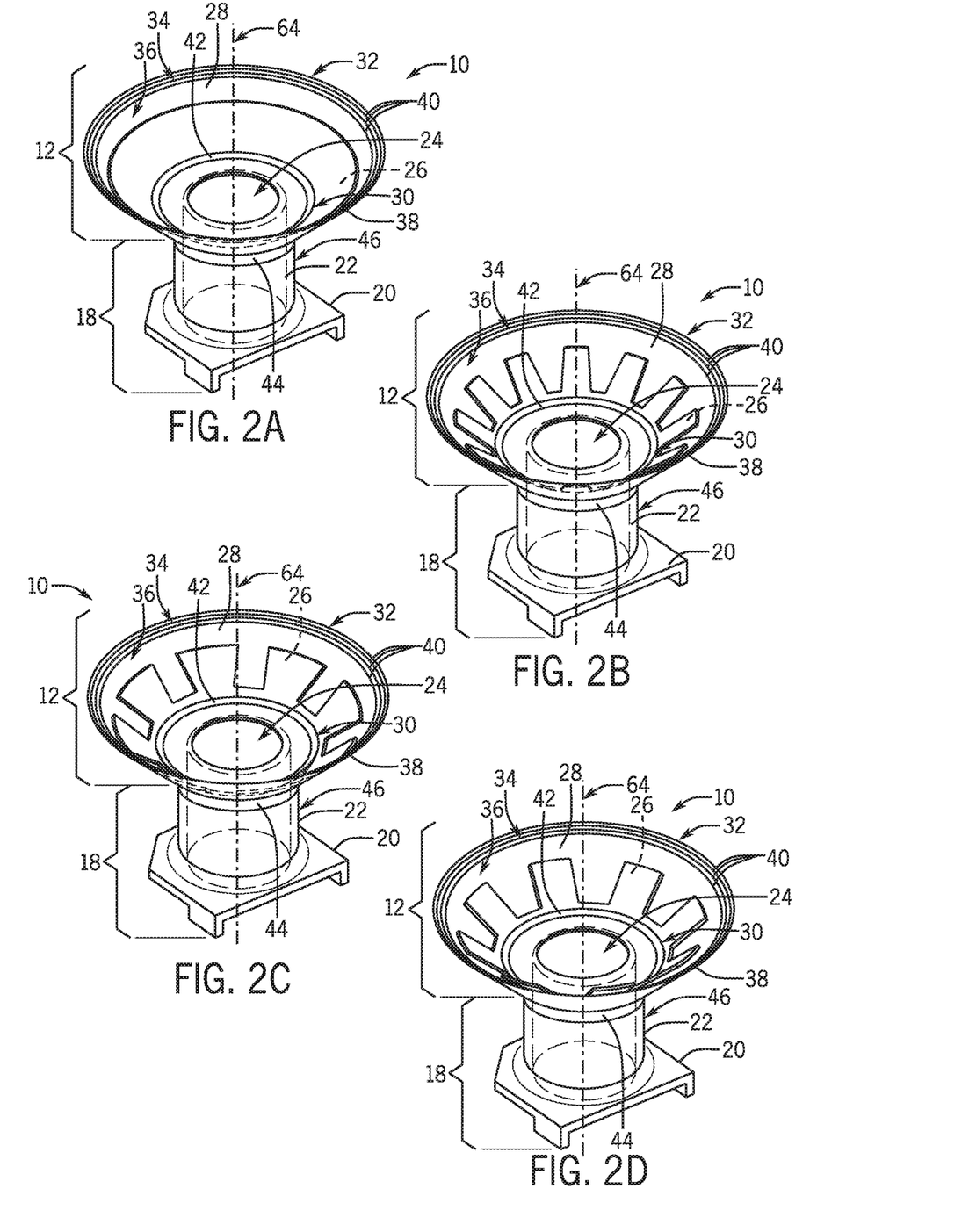
FIGS. 2A-2D are perspective partial cut away views of grommets with an embedded shape memory alloy component in accordance with the present subject matter.

Referring to the figures, and particularly to FIG. 1, a vehicle assembly 2 includes a steering gearbox 4 arranged in an engine room 6 of a vehicle. The steering gearbox 4 protrudes through a hole (not shown) in a vehicle panel 8 to a passenger's compartment (not shown) on an opposite side of the panel 8 to allow a vehicle operator to steer wheels of the vehicle. A grommet 10 is arranged on the steering gearbox 4 such that the grommet 10 completely surrounds a steering column of the steering gearbox 4.

The grommet 10 includes a sealing portion 12 that when in an engagement position as shown in FIG. 1, contacts the surface 14 of the panel 8 to create a water-tight seal 16 around the hole in the panel 8. The grommet 10 also includes a body 18 including a foot 20 and a trunk 22. The sealing portion 12 is connected to the trunk 22 and the trunk 22 is arranged between the sealing portion 12 and the foot 20.

The grommet 10 comprises an opening 24 extending through the sealing portion 12 and the body 18, including through the foot 20 and the trunk 22. The opening 24 in the grommet 10 is configured to allow the grommet 10 to be arranged on the steering gearbox 4 such that the steering gearbox 4 passes through the opening 24 in the grommet 10 and the grommet 10 forms a ring around the steering gearbox 4. The opening 24 may have a predetermined cross-sectional size and shape to snuggly mate with the steering gearbox 4. The trunk 22 of the body 18 may be in the general shape of a hollow cylinder as depicted in the figures, and the foot 20 may have a width greater than a diameter of the trunk 22 as depicted.

The sealing portion 12 includes a shape memory alloy 26 embedded in a resin matrix 28. The body 18 is also formed from the resin matrix 28. Shape memory alloys are a class of smart materials known for their mechanical properties' high dependence upon temperature and the ability to memorize trained shapes. Nickel-titanium (NiTi) is a shape memory alloy that can be used in the present subject matter, and can recover strains up to 8% and experience changes in elastic modulus from the martensite to austenite phase by as much as 500%. The recovery of such large strains is the result of temperature and stress-induced phase transformations between a low-temperature martensite phase and a high-temperature austenite phase.

Other shape memory alloys that can be used include for example, Cu—Al—Ni, alloys of zinc, copper, gold, and iron, Fe—Mn—Si, Cu—Zn—Al, Cu—Al—Ni, Ag—Cd, Au—Cd, Cu—Sn, Cu—Zn, Cu—Zn—X (X=Si, Al, Sn), Fe—Pt, Mn—Cu, Fe—Mn—Si, Co—Ni—Al, Co—Ni—Ga, Ni—Fe—Ga, Ti—Nb, Ni—Ti, Ni—Ti—Hf, Ni—Ti—Pd, Ni—Mn—Ga, Kevlar 29, Kevlar 49, $\alpha$-$ZrW_2O_8$, $\beta$-$ZrW_2O_8$, $\beta$-eucryptite, $Cd(CN)_2$, $ReO_3$, $(HfMg)(WO_4)_3$ $Sm_{2.75}C_{60}$, $Bi_{0.95}La_{0.05}NiO_3$, Fe-36Ni, $Fe_3Pt$, $Tm_2Fe_{16}Cr$, CuO, $Mn_3Cu_{0.53}Ge_{0.47}N$, $Mn_3Zn_{0.4}Sn_{0.6}N_{0.85}C_{0.15}$, $Mn_3Zn_{0.4}Sn_{0.5}N_{0.85}B_{0.05}$, composites including these, and combinations thereof.

The resin matrix in which the shape memory alloy is embedded, is not particularly limited by the present subject matter and can include various elastomer resins including natural and synthetic rubbers, EPD, EPDM, styrene butadiene (SBR), polyacrylic, polyvinyl acetate (PVA), polyvinyl chloride (PVC), polychloroprene (i.e. neoprene), polybutadiene, polyisoprene, butyl rubber, nitrile rubber, ethylene-vinyl acetate, thermoplastic elastomers, polyurethane, polypropylene, nylon, polyethylene, polyacrylic, ethylene acrylic, chlorosulfonyl polyethylene, epichlorohydrin, polyisobutylene, polysiloxane, hydrogenated nitrile rubber, fluorocarbon rubber, fluorosilicone rubber, perfluorocarbon rubber, and combinations thereof. The resin matrix can optionally include reinforcing fibers or other types of reinforcement material. In one non-limiting embodiment, the body 18 also comprises the resin matrix 28, and optionally may be free of the shape memory alloy 26.

Figure 10:
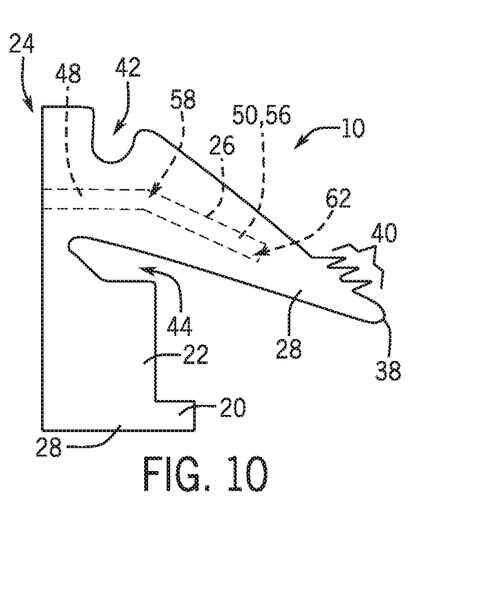
FIG. 10 is a partial sectional view of the grommet of FIG. 9 in a non-engagement position.

The sealing portion 12 generally assumes the shape and orientation of the shape memory alloy 26, which reinforces the resin matrix 28 of the sealing portion 12. The orientation of the sealing portion 12 corresponds with the orientation of the shape memory alloy 26, and movement of the shape memory alloy 26 causes a corresponding movement of the sealing portion 12 in which the shape memory alloy 26 is embedded. When the shape memory alloy 26 is in the deformed configuration, the sealing portion 12 is in the non-engagement position (FIG. 10).

The shape memory alloy 26 is selectively moveable from the deformed configuration toward the pre-deformed configuration upon being heated to a critical temperature (i.e. a temperature above the austenite start and finish temperatures of the shape memory alloy 26, which thermally actuates the shape memory alloy 26 to move from the deformed configuration toward the pre-deformed configuration). The shape memory alloy 26 may be heated to the critical temperature by heat produced from an initial operation of an engine of the vehicle. Upon initially operating the vehicle engine, heat from the engine will heat the shape memory alloy to the critical temperature, and thus actuate the shape memory alloy to move from the deformed configuration toward the pre-deformed configuration.

Figure 9:
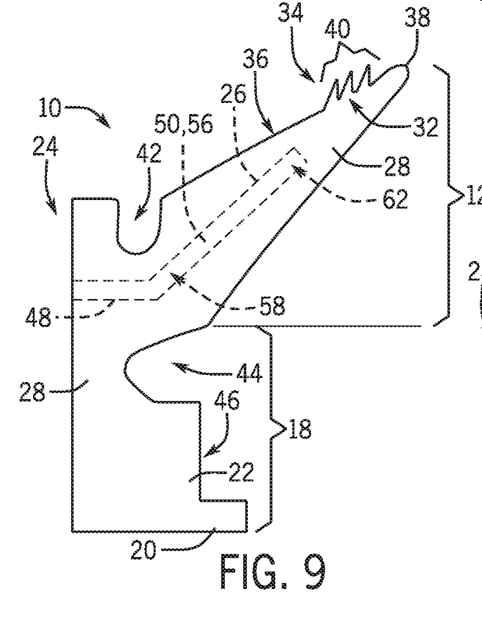
FIG. 9 is a partial sectional view of a grommet in an engagement position in accordance with the present subject matter.

When the shape memory alloy 26 is thermally actuated by heating to move from the deformed configuration toward the pre-deformed configuration, the sealing portion 12 also moves from the non-engagement position to the engagement position (FIGS. 1 and 9). Accordingly, the grommet 10 is thermally activated to cause the sealing portion 12 to move to the engagement position and to thereby form the seal 16 against the surface 14 of the panel 8. The seal 16 is formed, not by linear compression of the grommet 10 as is done conventionally, but by thermally actuated movement of the sealing portion 12 and corresponding engagement of the sealing portion 12 with the panel 8. Thus, the formation of the seal 16 does not require an operator to separately actuate the grommet 10 during vehicle assembly, and therefore the grommet 10 is self-sealing.

The sealing portion 12 has a connected end 30 contacting and attached to the body 18, and an engagement end 32 distal from the body 18. As depicted, the sealing portion 12 is generally in the shape of a funnel or bowl, with a diameter of the sealing portion 12 increasing going away from the body 18 from the connected end 30 to the engagement end 32. The engagement end 32 of the sealing portion 12 includes a sealing surface 34 on an inner surface 36 of the grommet 10 near the annular sealing rim 38 of the engagement end 32. The engagement end 32 can include a set of concentric annular sealing ribs 40 extending from the inner surface 36 adjacent to the rim 38. The sealing portion 12 is activatable to move from a non-engagement position where the sealing portion 12 does not contact the surface 14 of the panel 8, to an engagement position (FIG. 1) where the sealing portion 12 does contact the surface 14 of the panel 8. When in the engagement position, the sealing portion 12 forms a seal 16 with the surface 14 of the panel 8 and around the hole in the panel 8. The sealing ribs 40 contact the panel 8 when the sealing portion 12 is moved to the engagement position. The ribs 40 flex under the sealing force provided by the shape memory alloy 26, and thereby inhibit the flow of water or other liquids, or particles across the seal 16, through the hole in the panel 8, and between the engine room 6 and the passenger compartment.

The grommet 10 may include a first annular void 42 in the resin matrix 28 at the inner surface 36 of the grommet 10, and a second annular void 44 in the resin matrix 28 at an outer surface 46 of the grommet 10. In cross-section (FIGS. 9 and 10), the voids 42, 44 create a portion of the grommet 10 that has a smaller cross-sectional thickness than adjacent portions of the grommet 10 such that the voids 42, 44 are indentations in the inner surface 36 and the outer surface 46 of the grommet 10.

The first and second voids 42, 44 facilitate flexing of the resin matrix 28 when the shape memory alloy 26 is moved between the deformed configuration (e.g. inverted funnel or inverted bowl shape) and the pre-deformed configuration (e.g. funnel or bowl shape). Without these voids 42, 44 being present and if instead the voids 42, 44 were occupied by resin, then the resin matrix 28 itself may inhibit the shape memory alloy 26 from moving between the deformed and pre-deformed configurations. If the voids 42, 44 were not present, and instead the voids 42, 44 were occupied by resin, then movement of the sealing portion 12 from the non-engagement position to the engagement position may cause the resin matrix 28 may rip, tear, break, or otherwise rupture at these locations during such movement. As depicted, one of the voids 42, 44 in the resin matrix 28 is arranged on each side of the shape memory alloy 26, where force and stress are concentrated in the resin matrix 28 when the shape memory alloy 26 moves between the deformed configuration and the pre-deformed configuration.

Figure 4:
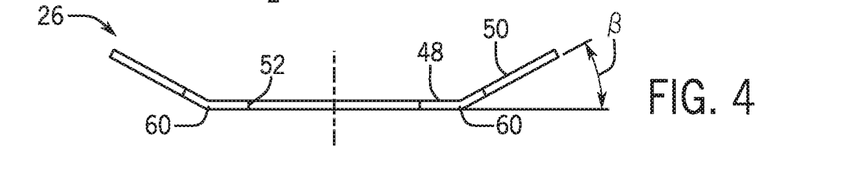
FIG. 4 is a side sectional view of a shape memory alloy component in accordance with the present subject matter.
Figure 5:
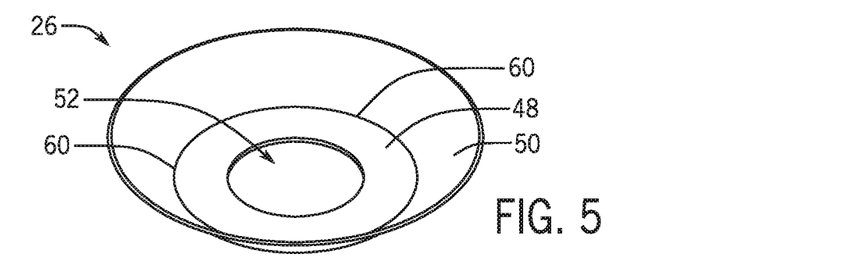
FIGS. 5-8 are perspective view of shape memory alloy components in accordance with the present subject matter.
Figure 6:
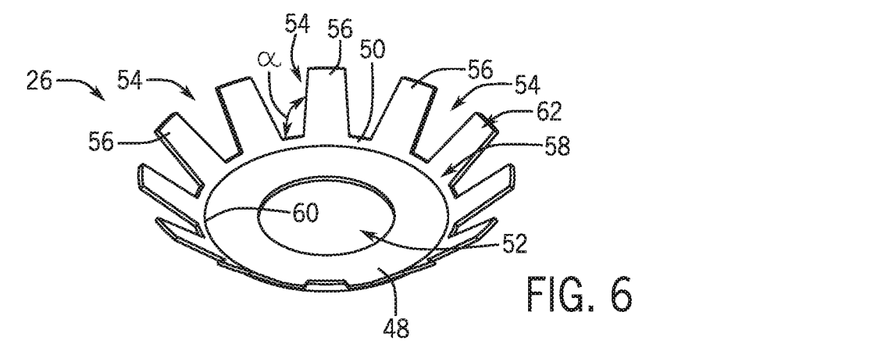
Figure 7:
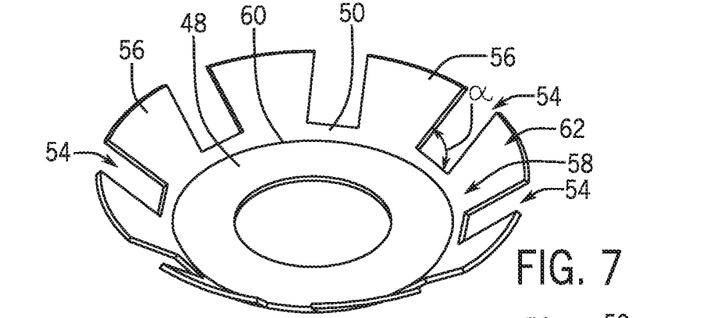
Figure 8:
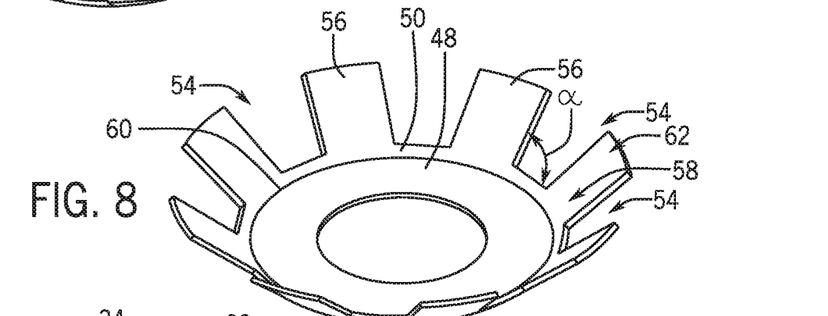

The shape memory alloy 26 is included in the sealing portion 12 of the grommet 10 and includes a base 48 and a flange 50 directly attached to the base 48. The shape memory alloy 26 may be formed from a flat sheet material having a thickness of 1-5 mm. The shape memory alloy 26 is trained (i.e. shape-set) to have a pre-deformed configuration (FIG. 4), wherein the flange 50 has a bend angle β of 10° to 60° measured relative to the base 48. The shape memory alloy 26 may be trained by a thermally-induced process that occurs under conditions of fixed stress, when the alloy is heated to temperatures of approximately 500° C. for 10 to 25 minutes and then quenched. In this process, the shape memory alloy 26 is heated to the austenite phase, and while holding the shape memory alloy 26 in the pre-deformed configuration, the shape memory alloy 26 is cooled to room temperature to have the twinned martensite phase. As a result, the shape memory alloy 26 maintains the pre-deformed configuration without being held in that configuration. The shape memory alloy 26 may also be trained by mechanical cycling under conditions of fixed temperature.

When in the pre-deformed configuration (FIGS. 4-9), the flange 50 may be in the shape of a hollow frustum. The frustoconical flange 50 extends up from the base 48 and a diameter of the flange 50 increases going away from the base 48. The shape memory alloy 26 may therefore be in the general shape of a funnel or bowl, for example.

The shape memory alloy 26 also includes an aperture 52 in the base 48 that is coextensive with the opening 24. The base 48 may be in the general shape of an annulus. The diameter $D_1$ of the aperture 52 is less than a diameter $D_2$ of the annular base 48 as depicted. The diameter $D_1$ of the aperture 52 is larger than a diameter of the steering gearbox 4 so that the steering gearbox 4 can be inserted through the aperture 52 when the grommet 10 is mounted to the steering gearbox 4.

The flange 50 may include one or more gaps 54 defining one or more fingers 56 as depicted. Each of the fingers 56 extend away from the base 48 and towards the engagement end 32 of the sealing portion 12. Each of the fingers 56 includes a first end 58 that is connected to a peripheral edge 60 of the base 48, and a second end 62 that is distal to the first end 58. When the shape memory alloy 26 is in the pre-deformed configuration, each of the fingers 56 has a bend angle β of 10° to 60° measured relative to the base 48.

As depicted between FIGS. 5-8, the size, shape, and number of the gaps 54 and fingers 56 can be adjusted as desired for a particular application. The number of fingers 56 is not particularly limited by the present subject matter, and in one non-limiting embodiment, the flange 50 includes 0-20 fingers, 1-20 fingers, or 8-12 fingers, for example. The flange 50 may also include more than twenty fingers. The flange 50 may include 0-20 gaps or more. The flange 50 may include for example, no gaps (FIG. 5) such that the flange 50 is a continuous flange (i.e. no fingers), one gap defining one finger, two gaps defining two fingers, eight gaps (FIGS. 7-8) defining eight fingers, twelve gaps (FIG. 6) defining twelve fingers, or more or less gaps 54 and fingers 56 as desired for a particular application.

The gaps 54 and fingers 56 in the shape memory alloy 26 allow the sealing portion 12 to more easily accommodate local geometric variations in the surface 14 of the panel 8 so that the grommet 10 can form a satisfactory seal 16 with the surface 14. More specifically, upon actuation of the shape memory alloy 26, each of the fingers 56 can move toward the pre-deformed configuration an amount that is independent of the movement of the other fingers 56. This allows each of the fingers 56 to press with an even sealing force against the surface 14, which may be undulating or otherwise irregularly shaped or irregularly arranged with respect to the grommet 10. Independent movement of the fingers 56 allows the proper amount of sealing force to be applied to seal the local portion of the surface 14 of the panel 8 adjacent to each of the fingers 56. This allows for proper sealing of the grommet 10 against the surface 14 of the panel 8, and does not required the surface 14 of the panel 8 to be perpendicular to an axis 64 of the grommet 10.

The fingers 56 can each have a width that increases, decreases, or is consistent going away from the base 48 from the first end 58 to the second end 62 of the fingers 56. Furthermore, each of the fingers 56 can have a width that is the same as or different than the widths of the other fingers 56.

Figure 3:
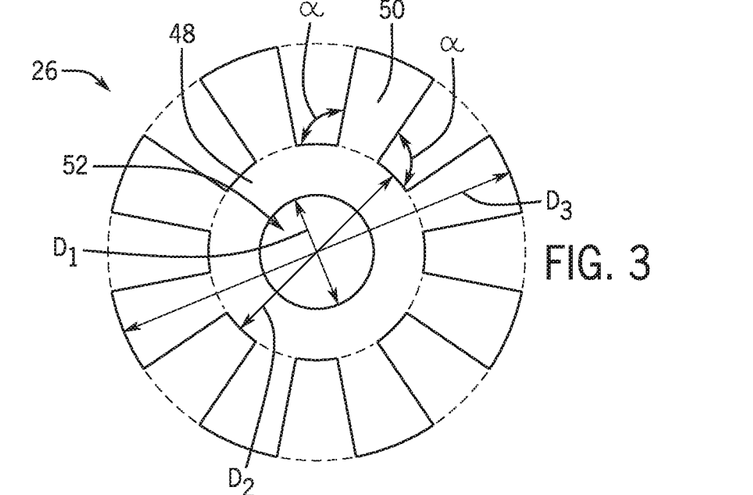
FIG. 3 is a plan view of a shape memory alloy component in accordance with the present subject matter.

The fingers 56 have a finger angle α (FIG. 3) with respect to the peripheral edge 60 of the base 48. The finger angle α can range from 70-110°. In one embodiment, the finger angle α of each of the fingers 56 is about 90°. Each of the fingers 56 can have a finger angle α that is the same as or different than the finger angles α of the other fingers 56.

These and other geometric variables of the shape memory alloy 26 can be adjusted in order to tune the shape memory alloy 26 for installation on a particular vehicle. For instance, the geometric variables of the shape memory alloy 26 can be adjusted so that the shape memory alloy 26 will be thermally actuated within a predetermined period of time from a start of an initial operation of the engine. Additionally, tuning the shape memory alloy 26 also allows for adjustment of the amount of sealing force provided by the shape memory alloy 26. For instance, a shape memory alloy 26 that is larger and/or thicker may provide more sealing force than a shape memory alloy 26 that is smaller and/or thinner.

Since different types of vehicles include different types of engines and have engine rooms that are differently configured such that the grommet may be arranged closer to or further from the engine, the grommet may therefore experience different amounts of heat transferred from the initial operations of different engines in different vehicles. Geometric variables and the composition of the shape memory alloy 26 can be adjusted in order for the shape memory alloy 26 to reach a critical temperature within a predetermined period of time from the start of the initial operation of the engine. In this respect, the geometric variables and composition of the shape memory alloy 26 influence the critical temperature and the amount of time at which the shape memory alloy 26 is thermally actuated to move from the deformed configuration toward the pre-deformed configuration. Adjusting these geometric variables and/or composition accommodates for the different amount of heat transfer during the initial operation of different engines in different types of vehicles.

The geometric variables that can be adjusted to tune the shape memory alloy 26 for a particular application include the thickness of the shape memory alloy 26, the finger angle α, the bend angle β, the diameter $D_1$ of the aperture 52, the diameter $D_2$ of the base 48, the overall diameter $D_3$ of the shape memory alloy 26, the number of fingers 56, the width of the fingers 56 etc.

The compositional variables that can be adjusted to tune the shape memory alloy 26 for a particular application include the alloy used and the ratio of the elements in the selected alloy. For example, the phase transformation temperatures of an alloy with a 0.98 nickel/titanium ratio are different than those for an alloy with a 1.02 nickel/titanium ratio.

After having been trained to be in the pre-deformed configuration, the shape memory alloy 26 can be embedded in the resin matrix 28 by molding the shape memory alloy 26 in the resin matrix 28 and cooling the resin matrix 28 and shape memory alloy 26 to form the grommet 10. Molding produces a grommet 10 where the shape memory alloy 26 is included in the sealing portion 12 in a pre-deformed configuration. The shape memory alloy 26 can be embedded in the resin matrix 28 by injection molding, transfer molding, rotational molding, blow molding, compression molding, or extruding, for example. Other embedding techniques can be used.

In an alternate embodiment, the shape memory alloy 26 is not embedded in the resin matrix 28, but is simply fastened to the resin matrix 28 such as by fasteners, a compression fitting, or by adhesive. In this embodiment, the resin matrix 28 is formed separately from the shape memory alloy 26, and the two are fastened together.

As seen in the partial cut away views of FIGS. 2A-2D, each of which show the shape memory alloy 26 embedded in the sealing portion 12 of the grommet 10, the shape memory alloy 26 may not extend all the way to the rim 38. As such the engagement end 32 of the sealing portion 12 may not be entirely reinforced by shape memory alloy 26, and this allows additional flexing of resin matrix 28 at the engagement end 32 to provide improved water-tightness in the seal 16. This may also allow the resin matrix 28 at the engagement end 32 to sufficiently deform under the sealing forces and thus conform better to the surface 14 of the panel 8, which may be irregular.

Once included as part of the grommet 10, the shape memory alloy 26 can then be deformed from the pre-deformed configuration to a deformed configuration having a detwinned martensite phase, where the shape memory alloy 26 may have for example, a general inverted bowl shape (FIG. 10 depicting half of the inverted bowl shape). This deformation of the shape memory alloy 26 to the deformed configuration causes the sealing portion 12 to move from the engagement position to the non-engagement position. In the engagement position, the sealing portion 12 may extend up going away from the base 48 as depicted in FIG. 9. In the non-engagement position, the rim 38 of the sealing portion 12 is arranged closer to the foot 20 than when the sealing portion 12 is in the engagement position. The sealing portion 12 may even extend down going away from the base 48 when in the non-engagement position as depicted in FIG. 10. However this is not required, and the sealing portion 12 may extend horizontal going away from the base 48 or even extend up going away from the base 48 but at a less steep incline than when in the engagement position.

The grommet 10 can then be mounted to the steering gearbox 4, such that the steering gearbox 4 protrudes through the opening 24 in the grommet 10 and the grommet 10 extends entirely around a circumference of the steering gearbox 4. The body 18 of the grommet 10 may be secured to the steering gearbox 4 so that the body 18 does not move relative to the steering gearbox 4. The sealing portion 12 however is free to move relative to the steering gearbox 4 from a non-engagement position to an engagement position as described herein. The steering gearbox 4 and grommet 10 can then be arranged in the vehicle with the grommet 10 being arranged in the engine room 6 of the vehicle and the steering gearbox 4 projecting through the hole in the panel 8 to the passenger compartment of the vehicle.

When the grommet 10 is arranged on the steering gearbox 4 and in the engine room 6, and when the sealing portion 12 is in the non-engagement position, then the sealing portion 12 does not contact the panel 8. If, during installation of the steering gearbox 4 in vehicle, the sealing portion 12 were instead in the engagement position, the sealing portion 12 may interfere with installation of the steering gearbox 4 due to possible contact between the sealing portion 12 and the panel 8. Instead, the non-contact between the grommet 10 and the panel 8 facilitates free arrangement of the steering gearbox 4 on the vehicle without hindrance that could be caused by possible contact between the sealing portion 12 and the panel 8.

When the grommet 10 is arranged on the vehicle, the sealing portion 12 is in the non-engagement position, and the shape memory alloy 26 is in the deformed configuration, the initial operation of the engine heats the shape memory alloy 26 to the critical temperature and causes the shape memory alloy to move from the pre-deformed configuration toward the deformed configuration within the predetermined amount of time from the start of the initial operation of the engine. This movement of the shape memory alloy 26 causes the sealing portion 12 to correspondingly move to the engagement position and to contact and seal against the surface 14 of the panel 8 to form the seal 16. In this way the self-sealing grommet 10 is thermally actuated by heat transfer through convection from the initial operation of the engine, which causes the shape memory alloy 26 to move from the deformed configuration toward the pre-deformed configuration, which causes the sealing portion 12 of the grommet 10 to move from the non-engagement position to the engagement position. When the sealing portion 12 is in the engagement position, the sealing surface 34 of the grommet 10 contact and seal against the surface 14 of the panel 8 to create a water-tight seal 16 around the hole in the panel 8. Heat that is used to thermally actuate the grommet 10 can be directly provided by the engine that is located in the engine room 6, or may be provided by a heating system of the vehicle.

The seal 16 is formed by movement of the sealing portion 12 and sealing force that the sealing portion exerts against the panel 8 due to movement of the shape memory alloy 26. Because the seal 16 is not formed by linear compression of the grommet 10 against the panel 8 as is conventional, formation of the seal 16 does not require the surface 14 of the panel 8 to be substantially perpendicular to the axis 64 of the grommet 10. Instead, the surface 14 can be angled other than perpendicular with respect to the axis 64 of the grommet 10. Moreover, when the shape memory alloy 26 includes fingers 56, which can accommodate geometric variations in surface 14 or varying orientations of the surface 14 with respect to the grommet 10, there is even less need for the surface 14 to be perpendicular to the axis 64 of the grommet 10.

The shape memory alloy 26 is configured to bend at an intersection 66 where the flange 50 meets the base 48 when the shape memory alloy 26 is deformed from the pre-deformed configuration to the deformed configuration. Likewise, the shape memory alloy 26 is configured to bend at the intersection 66 and when the shape memory alloy 26 is thermally actuated to move back toward the pre-deformed configuration. As depicted, one of the voids 42, 44 in the resin matrix 28 is arranged on each side of the intersection 66, which is where force and stress are concentrated in the resin matrix 28 during movement of the shape memory alloy 26 between the deformed configuration and the pre-deformed configuration, in order to relieve stress in the resin matrix 28 in these locations during such movement.

The present invention does not rely on linear compression of the grommet 10 to form the seal 16, and therefore does not require the surface 14 and the compression direction to be perpendicular. The grommet is thermally actuated, and therefore does not necessitate operator action to set the final shape of the grommet 10 to form the seal 16. Instead the thermal actuation of the grommet 10 sets the final engagement position without concern for operator mistake. The grommet 10 also does not require any fastening by an operator and therefore cannot be misassembled by an operator.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A self-sealing vehicle steering gearbox grommet comprising a sealing portion including a shape memory alloy embedded in a resin matrix, wherein:
   the shape memory alloy includes a base and a plurality of fingers extending away from the base and towards an engagement end of the sealing portion;
   the shape memory alloy is selectively moveable from a deformed configuration toward a pre-deformed configuration if heated to a critical temperature; and
   the sealing portion includes one or more sealing ribs protruding from a rim of the sealing portion.

2. The grommet according to claim 1, wherein the fingers each have a bend angle of 10° to 60° relative to the base when in the pre-deformed configuration.

3. The grommet according to claim 1, wherein the shape memory alloy includes from 2 to 20 fingers.

4. The grommet according to claim 1, wherein:
   each of the fingers include a first end that is connected to a peripheral edge of the base and a second end that is distal to the first end; and
   each of the fingers has a width that decreases from the first end to the second end.

5. The grommet according to claim 1, wherein a thickness of the shape memory alloy is 1-5 mm.

6. The grommet according to claim 1, wherein the rim is an annular sealing rim, and the one or more sealing ribs includes a plurality of concentric annular ribs.

7. The grommet according to claim 1, wherein:
   the grommet further comprises a body including a foot and a trunk connected to the foot;
   the sealing portion is connected to the trunk; and
   the trunk is arranged between the foot and the sealing portion.

8. The grommet according to claim 1, further comprising a first annular void in the resin matrix arranged on an inside surface of the grommet and above the base of the shape memory alloy, and a second annular void in the resin matrix arranged on an outside surface of the grommet and below the base of the shape memory alloy.

9. A vehicle assembly method comprising:
   providing a self-sealing grommet comprising a sealing portion including a shape memory alloy embedded in a resin matrix, the sealing portion being activatable to move from a non-engagement position to an engagement position;
   arranging the grommet on a steering gearbox of the vehicle and adjacent to a hole in a surface of the vehicle, wherein the grommet is in the non-engagement position and does not contact the surface; and
   operating the vehicle to heat the sealing portion to a critical temperature to thereby activate and move the sealing portion from the non-engagement position to the engagement position such that the sealing portion contacts the surface and seals the hole.

10. The method according to claim 9, wherein:
    the grommet is arranged in an engine room of the vehicle housing an engine; and
    the sealing portion is heated to the critical temperature by heat provided by an initial operation of the engine.

11. The method according to claim 10, wherein:
    the grommet is arranged around the steering gearbox of the vehicle; and
    the hole is arranged in a panel of the vehicle through which the steering gearbox protrudes from the engine room towards a passenger compartment.

12. The method according to claim 10, wherein the grommet is tuned to the engine such that the sealing portion is activated within a predetermined period of time from a start of the initial operation of the engine.

13. The method according to claim 10, wherein the heat provided by the initial operation of the engine is transferred to the sealing portion by convection.

14. The method according to claim 9, wherein:
    the shape memory alloy is in a deformed configuration when the sealing portion is in the non-engagement position, the shape memory alloy having been trained to be in a pre-deformed configuration before being deformed to be in the deformed configuration;

when the sealing portion is activated to move to the engagement position, the shape memory alloy moves from the deformed configuration toward the pre-deformed configuration.

15. The method according to claim 14, wherein:
the shape memory alloy includes an annular base, and an aperture in the base, a frustoconical flange attached to the base;
when in the pre-deformed configuration, the shape memory alloy is in a general shape of a bowl such that the flange extends up from the base and a diameter of the flange increases going away from the base; and
when in the deformed configuration, the shape memory alloy is in a general shape of an inverted bowl such that the flange extends down from the base.

16. The method according to claim 15, wherein the flange, in the pre-deformed configuration, has a bend angle of 10° to 60° relative to the base.

17. The method according to claim 15, wherein the flange includes a plurality of gaps thereby defining a plurality of fingers on the flange extending away from the base and towards an engagement end of the sealing portion.

18. The method according to claim 17, wherein the fingers each have a width that decreases going away from the base.

19. The method according to claim 15, wherein:
an opening extends through the grommet;
the aperture is aligned with the opening; and
a steering gearbox of the vehicle protrudes through the opening and through the aperture.

20. The method according to claim 9, wherein the sealing portion comprises an annular sealing rim including a plurality of concentric annular ribs that contact the surface to seal the hole.

* * * * *